(12) United States Patent
Li

(10) Patent No.: US 7,141,160 B2
(45) Date of Patent: Nov. 28, 2006

(54) CHIRAL COLUMNS WITH BROAD CHIRAL SELECTIVITY

(75) Inventor: Tingyu Li, Mississippi State, MS (US)

(73) Assignee: Vanderbilt University, Nashville, TN (US)

( * ) Notice: Subject to any disclaimer, the term of this patent is extended or adjusted under 35 U.S.C. 154(b) by 73 days.

(21) Appl. No.: 10/833,602

(22) Filed: Apr. 28, 2004

(65) Prior Publication Data

US 2004/0226889 A1    Nov. 18, 2004

Related U.S. Application Data

(60) Provisional application No. 60/465,930, filed on Apr. 28, 2003.

(51) Int. Cl.
*B01D 15/08* (2006.01)
(52) U.S. Cl. ............ 210/198.2; 210/502.1; 210/635; 210/656; 502/401
(58) Field of Classification Search ........ 210/635, 210/656, 659, 198.2, 502.1; 502/401, 402, 502/403, 404
See application file for complete search history.

(56) References Cited

U.S. PATENT DOCUMENTS

| | | | | |
|---|---|---|---|---|
| 4,469,875 A | * | 9/1984 | Busker et al. | 548/532 |
| 4,587,250 A | * | 5/1986 | Klauser et al. | 514/278 |
| 4,590,167 A | * | 5/1986 | Gunther et al. | 436/162 |
| 4,604,207 A | * | 8/1986 | Oi et al. | 210/635 |
| 4,627,919 A | * | 12/1986 | Yuki | 210/656 |
| 4,694,044 A | * | 9/1987 | Kiniwa | 525/178 |
| 4,960,762 A | * | 10/1990 | Sellergren et al. | 514/57 |
| 4,963,254 A | * | 10/1990 | Oi et al. | 210/198.2 |
| 5,059,654 A | * | 10/1991 | Hou et al. | 525/54.1 |
| 5,431,807 A | * | 7/1995 | Frechet et al. | 210/198.2 |
| 5,786,428 A | * | 7/1998 | Arnold et al. | 525/333.3 |
| 5,868,938 A | * | 2/1999 | Bomer et al. | 210/656 |
| 6,140,493 A | * | 10/2000 | Dower et al. | 536/25.4 |
| 6,503,398 B1 | * | 1/2003 | Ma et al. | 210/635 |
| 6,712,978 B1 | * | 3/2004 | Leinenbach et al. | 210/692 |
| 2005/0092686 A1 | * | 5/2005 | Li | 210/656 |

* cited by examiner

*Primary Examiner*—Ernest G. Therkorn
(74) *Attorney, Agent, or Firm*—Stites & Harbison PLLC; Richard S. Myers, Jr.

(57) ABSTRACT

A general chiral column with a multipleproline-based chiral stationary phase. Embodiments include chiral stationary phases of the following formula:

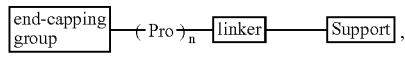

wherein n is any integer of 2 or greater, and analogs and isomers thereof.

13 Claims, 2 Drawing Sheets

L-Proline

Fmoc-Pro-Pro-(Me)N-(CH₂)₅CO-NH(CH₂)₃Silica Gel (2)

Fmoc-Pro-Pro-Pro-Pro-(Me)N-(CH₂)₅CO-NH(CH₂)₃Silica Gel (1)

Amino acid L-Proline and its associated stationary phases Fmoc-Pro-Pro-Silica and Fmoc-Pro₄-Silica

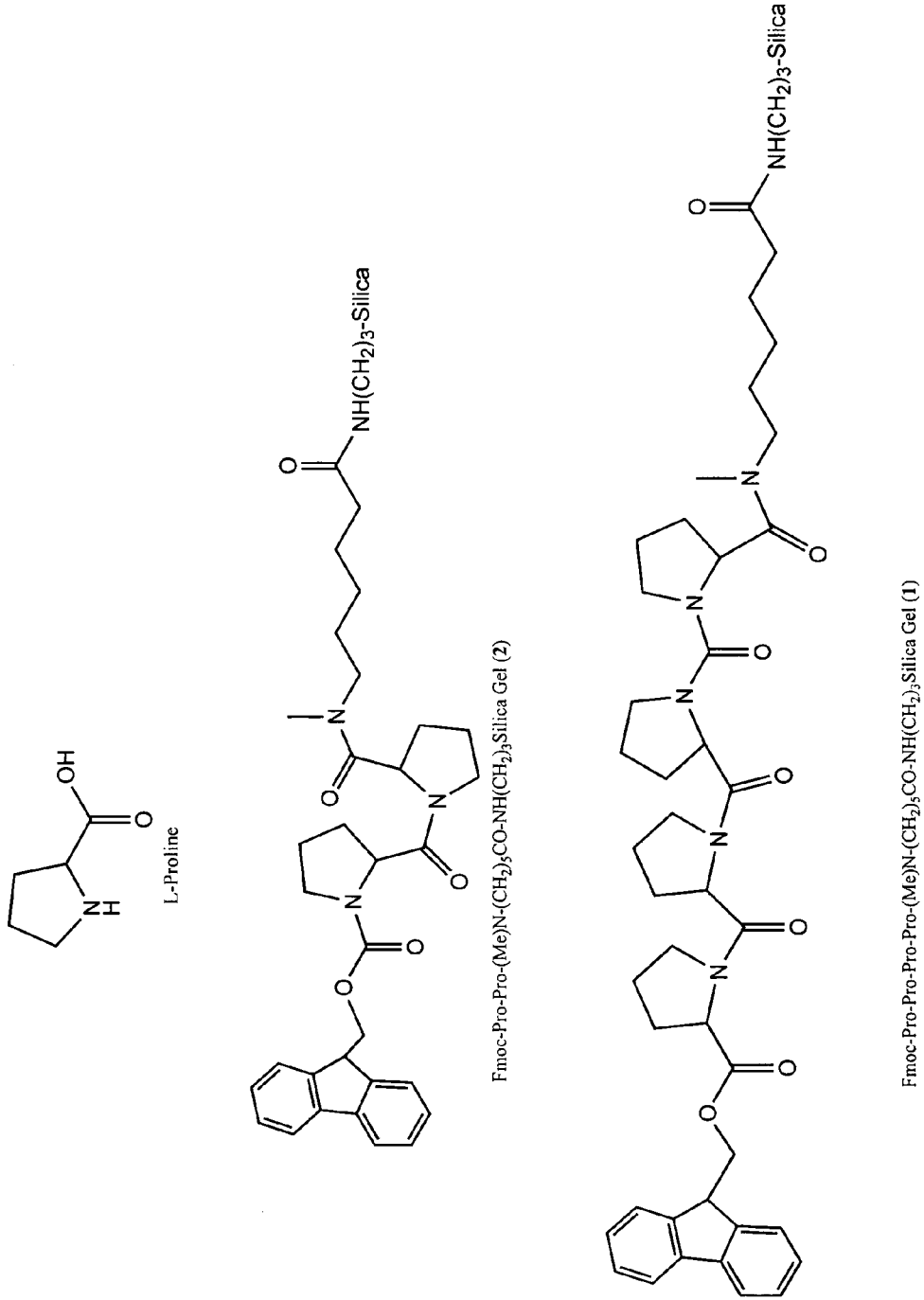
Figure 1. Amino acid L-Proline and its associated stationary phases Fmoc-Pro-Pro-Pro-Silica and Fmoc-Pro4-Silica

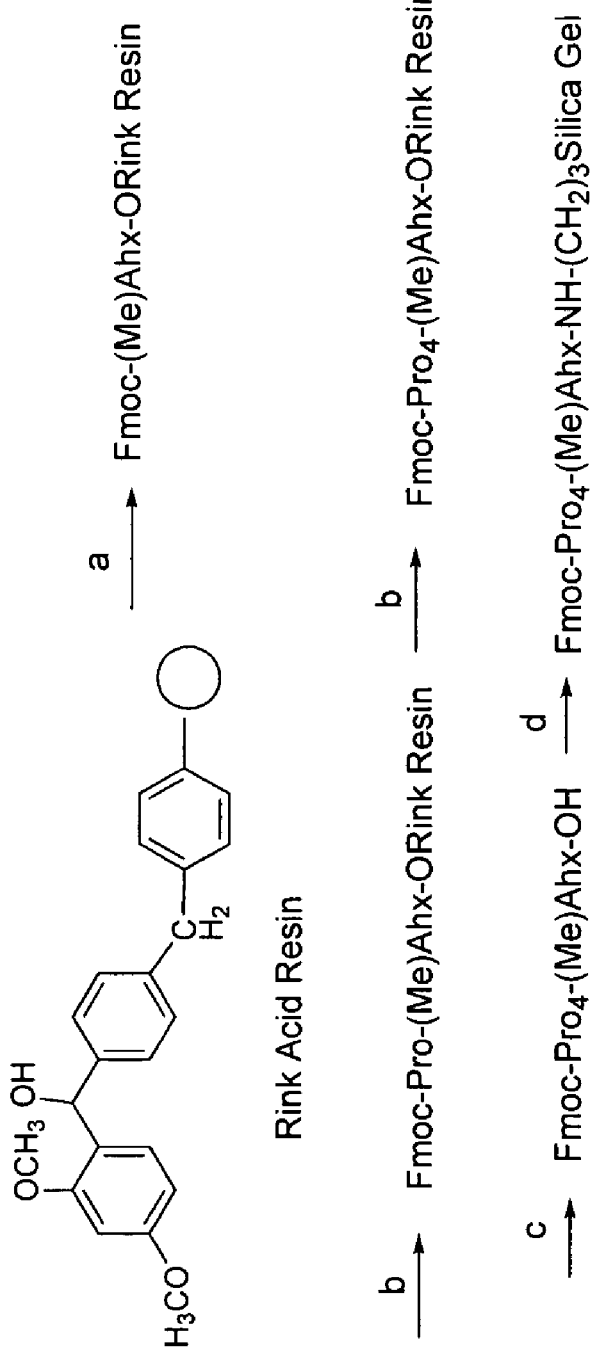
Figure 2: Synthesis of Fmoc-Pro₄-(Me)Ahx-APS chiral stationary phase: (a) Fmoc-(Me)Ahx-OH, DIC. (b) (1) Piperidine; (2) Fmoc-Pro-OH, HATU. (c) AcOH. (d) aminopropyl-silica gel, HATU

CHIRAL COLUMNS WITH BROAD CHIRAL SELECTIVITY

PRIORITY

This application claim priority to U.S. Application Ser. No. 60/465,930, filed Apr. 28, 2003, the contents of which are incorporated herein by reference in their entirety.

GOVERNMENT SUPPORT

This invention was made in connection with Grant Numbers NIH 1 R01 GM63812-01 and NIH 1 R01 GM60637-01A1, from the National Institutes of Health. The Government has rights to this invention.

FIELD OF THE INVENTION

The present invention relates to the field of chiral chemistry. More particularly, the present invention relates to the separation of enantiomers, i.e., those isomers in which the arrangement of atoms or groups is such that the two molecules are not superimposable.

The present inventor has developed a new class of chiral columns that can resolve a large number of racemic compounds. These columns are stable and can be used with a number of mobile phase solvents.

BACKGROUND OF THE INVENTION

Stereoisomers are those molecules which differ from each other only in the way their atoms are oriented in space. Stereoisomers are generally classified as diastereomers or enantiomers; the latter embracing those which are mirror-images of each other, the former being those which are not. The particular arrangement of atoms that characterize a particular stereoisomer is known as its optical configuration, specified by known sequencing rules as, for example, either + or − (also D or L) and/or R or S.

Though differing only in orientation, the practical effects of stereoisomerism are important. For example, the biological and pharmaceutical activities of many compounds are strongly influenced by the particular configuration involved. Indeed, many compounds are only of widespread utility when employed in a given stereoisomeric form.

Living organisms usually produce only one enantiomer of a pair. Thus only (−)-2-methyl-1-butanol is formed in yeast fermentation of starches; only (+)-lactic acid is formed in the contraction of muscle; fruit juices contain only (−)-malic acid, and only (−)-quinine is obtained from the cinchona tree. In biological systems, stereochemical specificity is the rule rather than the exception, since the catalytic enzymes, which are so important in such systems, are optically active. For example, the sugar (+)-glucose plays an important role in animal metabolism and is the basic raw material in the fermentation industry; however, its optical counterpart, or antipode, (−)-glucose, is neither metabolized by animals nor fermented by yeasts. Other examples in this regard include the mold Penicillium glaucum, which will only consume the (+)-enantiomer of the enantiomeric mixture of tartaric acid, leaving the (−)-enantiomer intact. Also, only one stereoisomer of chloromycetin is an antibiotic; and (+)-ephedrine not only does not have any drug activity, but it interferes with the drug activity of its antipode. Finally, in the world of essences, the enantiomer (−)-carvone provides oil of spearmint with its distinctive odor, while its optical counterpart (+)-carvone provides the essence of caraway.

Thus, as enzymes and other biological receptor molecules possess chiral structures, enantiomers of a racemic compound may be absorbed, activated, and degraded by them in different manners. This phenomenon causes that in many instances, two enantiomers of a racemic drug may have different or even opposite pharmacological activities. In order to acknowledge these differing effects, the biological activity of each enantiomer often needs to be studied separately. This and other factors within the pharmaceutical industry have contributed significantly to the need for enantiomerically pure compounds and thus the need for chiral chromatography.

Accordingly, it is desirable and oftentimes essential to separate stereoisomers in order to obtain the useful version of a compound that is optically active.

Separation in this regard is generally not a problem when diastereomers are involved: diastereomers have different physical properties, such as melting points, boiling points, solubilities in a given solvent, densities, refractive indices etc. Hence, diastereomers are normally separated from one another by conventional methods, such as fractional distillation, fractional crystallization or chromatography.

Enantiomers, on the other hand, present a special problem because their physical properties are identical. Thus they cannot as a rule—and especially so when in the form of a racemic mixture—be separated by ordinary methods: not by fractional distillation, because their boiling points are identical; not by conventional crystallization because (unless the solvent is optically active) their solubilities are identical; not by conventional chromatography because (unless the adsorbent is optically active) they are held equally onto the adsorbent. The problem of separating enantiomers is further exacerbated by the fact that conventional synthetic techniques almost always produce a mixture of enantiomers. When a mixture comprises equal amounts of enantiomers having opposite optical configurations, it is called a racemate; separation of a racemate into its respective enantiomers is generally known as a resolution, and is a process of considerable importance.

Chiral columns that can resolve a large number of racemic compounds (general chiral columns) are in high demand. They are needed routinely in many laboratories, especially in pharmaceutical industry. Prior to the present invention, Daicel columns, macrocyclic antibiotic columns, and the Whelk-O columns were probably known as the industrial leaders in this type of general chiral columns. The present inventor has developed a new class of general chiral columns based on the use of proline and its analogues.

Furthermore, and importantly, the columns of the present invention have the capability of resolving at least a similar or higher percentage of the compounds tested. Furthermore, the columns of the present invention provide better separation on some of the compounds tested and can resolve certain compounds that cannot be resolved with the commonly used commercial columns listed above.

The columns of the present inventions are stable and can be used with a large number of mobile phase solvents. Therefore, the columns of the present invention should find important applications as general chiral columns.

As stated above, a large number of chiral columns have been prepared in the past; however, only a few demonstrated broad chiral selectivity. The successful examples include the popular Daicel columns, the Chirobiotic columns, and the Whelk-O½ columns. The Daicel columns are prepared by coating sugar derivatives onto silica gel. Chirobiotic columns are prepared by immobilizing macrocyclic glycopeptides onto silica gel. Whelk-O ½ columns contain both electron rich and electron deficient aromatics. These columns have broad chiral selectivity and have been applied successfully to resolve a fair number of racemic compounds. They have different selectivity and stability profiles. Their selectivities complement each other in some cases, while they duplicate each other in other cases. Some of the columns are more suited for reversed phase conditions and others for normal phase conditions. Each column has its own strengths and weaknesses. Despite these progresses, there are still many compounds that cannot be resolved or resolved well using these commercial available columns. Therefore, there is still a significant need to develop new columns that have relatively broad chiral selectivity.

SUMMARY OF THE INVENTION

The present invention is directed to a chiral selector that represents an improvement in the art of enantiomeric separation. Thus, one embodiment of the present invention is a general chiral column with a multiple proline-based chiral stationary phase.

Another embodiment of the present invention is a chiral stationary phase made of peptides with 2 or more prolines, including chiral stationary phases with 2, 3, 4, 5, 6, or 10 prolines. Also included within the scope of the present invention are analogs and isomers of prolines, and analogs and isomers of the chiral selector compounds of the present invention.

Another embodiment of the present invention is a chiral stationary phase of the following formula:

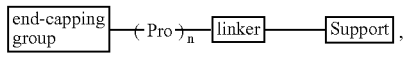

wherein n is any integer of 2 or greater, and analogs and isomers thereof. Another embodiment of the present invention is where n is any integer from 2–10.

The separations achieved for analytes are comparable or superior to those achieved on Daicel AD, Daicel OD, and Whelk O2 columns. The multiple proline-based chiral stationary phases of the present invention show promise as a superior general chiral column.

BRIEF DESCRIPTION OF THE DRAWINGS

FIG. 1 shows the structure for amino acid L-Proline and its associated stationary phases Fmoc-Pro$_4$-Silica (1) and Fmoc-Pro-Pro-Silica (2).

FIG. 2 shows the synthesis of one embodiment of the present invention, Fmoc-Pro$_4$-(Me)Ahx-APS chiral stationary phase.

DESCRIPTION OF THE INVENTION

The present inventor has developed a new chiral column that has relatively broad chiral selectivity, when compared with Daicel columns and Whelk O2 column, as industry standards or industry models. Additionally, the chiral columns of the present invention are stable in a number of mobile phase conditions.

The present inventor found from the same library a chiral selector [Fmoc-Hyp(tBu)-Pro] that has broad chiral selectivity when compared to chiral selectors such as those mentioned above, which may lead to a general chiral column. Although this high throughput approach is designed to identify effective chiral selectors for a given analyte, newly prepared columns could be evaluated quickly for general chiral separations.

In certain embodiments, this column contains only hydrogen bonding acceptor groups but no hydrogen bonding donor groups. It was subsequently evaluated using racemic compounds that contain one or more hydrogen bonding donor groups (HO or NH group). Of the thirteen compounds chosen based on their availability, it resolved nine. Since many compounds contain one or more hydrogen bonding donor groups, the column of the present invention could prove to be a useful general chiral column.

The success rate of the chiral column of the present invention compares well with the best commercially available general chiral columns developed over the last few decades. According to the online catalogue of Chiral Technologies, distributor of the most successful chiral columns, their five best columns could resolve 80% of the racemic compounds submitted to them.

Proline is a unique amino acid in many ways (FIG. 1). Instead of having a primary amino group as in other α-amino acids, it contains a secondary amine. Because of the cyclic structure, rotation around the nitrogen-α-carbon bond is restricted. Also because of the cyclic structure, proline is not ideally suited for α-helix or β-sheet conformation; instead, polyproline forms its own unique helical conformation (Polyproline I and polyproline II). The amide bond in polyproline is sterically hindered compared with other oligopeptides. The distinctly different conformational and structural features of polyprolines suggest that they may behave quite differently from other short oligopeptides that have been studied in chiral chromatography.

The present inventors discovered that proline based chiral selectors, including the embodiment tetraproline based chiral stationary phase 1 (FIG. 1) and diproline based chiral stationary phase 2 have relatively broad chiral selectivity, while mono-pro stationary phase is largely ineffective.

Immobilization of the chiral selectors of the present invention to silica gel is accomplished through a linker group. One example of a linker group of the present invention is a N-alkylamino group. A second example is a N-methylamino group. Another example is 6-N-methylaminohexanoic acid. The particular linker group can be selected by on of ordinary skill in the art depending on the analyte to be tested. For example, when the selector Fmoc-Pro-Pro is immobilized using 6-N-methylaminohexanoic acid, it may resolve about 16 out of about 22 analytes tested. For the same chiral selector, when immobilized using 6-amonihexanoic acid, it resolved about 4 out of the same group of analytes.

Preferred linkers of the present invention do not introduce a hydrogen-bonding donor NH group next to the Pro tetramer. The amide bond between this linker and pro residue is also more sterically hindered due to the N-methyl group. A preferred linker of the present invention is shown in connection with the synthesis shown in FIG. 2.

Additionally, the stationary phase compounds of the present invention may comprise various end-capping groups as known in the art.

By use of the term proline with respect to the present invention, it is understood that analogs and isomers of proline are included. For example all stereoisomers are included. Additionally, analog are included. Examples of the analogs that are included herein are those with the following structure feature:

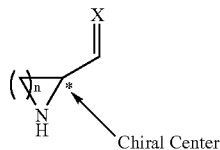

wherein n is an integer (such as 1, 2, 3, 4, 5, etc.) and X is O,S,N.

The columns of the present invention were evaluated using 22 racemic mixtures chosen based on their availability. The separation factors along with the capacity factors for the fast eluting enantiomer are shown below. For comparison, resolution of these 22 compounds was also studied with Daicel AD, Daicel OD, and Whelk O2 columns, the three most popular chiral columns used in normal phase mode. Their separation factors along with the capacity factors for the fast eluting enantiomer are also shown in an example, below. As seen in the examples, the di-proline and tetra-proline columns of the present invention are superior.

These covalently bound columns of the present invention are stable in common organic solvents, including $CH_2Cl_2$ and $CHCl_3$. Therefore, a wide selection of mobile phase conditions could be applied in method development. For several analytes, the present inventor attempted resolution with $CH_2Cl_2$/hexane as the mobile phase, finding column efficiency.

In terms of potential interaction modes with the analytes, examples of the chiral selectors of the present invention are forming attractive hydrogen bonds with the analyte.

The following examples and experimental section are designed to be purely exemplary in nature. Thus, this section should not be viewed as being limiting of the present invention.

EXAMPLES

Throughout this section, various abbreviations are used, including the following: DIC, diisopropylcarbodiimide; HATU, O-(7-Azabenzotriazol-1-yl)-N,N,N',N'-tetramethyluronium hexafluorophosphate; DIPEA, N,N-Diisopropylethylamine; DMF, N,N-Dimethylformamide; DCM, Dichloromethane; Fmoc-(Me)Ahx-OH, 6-[(9H-fluoren-9-ylmethoxy)carbonyl]methylamino hexanoic Acid; Fmoc-Pro-OH, N-α-Fmoc-L-proline.

General Supplies and Equipment

Amino acid derivatives were purchased from NovaBiochem (San Diego, Calif.). All other chemicals and solvents were purchased from Aldrich (Milwaukee, Wis.), Fluka (Ronkonkoma, N.Y.), or Fisher Scientific (Pittsburgh, Pa.). HPLC grade Kromasil® silica gel (particle size 5 µm, pore size 100 Å, and surface area 298 $m^2$/g) was purchased from Akzo Nobel (EKA Chemicals, Bohus, Sweden). Selecto silica gel (32–63 µm) from Fisher Scientific was used for flash column chromatographic purification of target compounds. Thin-layer chromatography was completed using EM silica gel 60 F-254 TLC plates (0.25 mm; E. Merck, Merck KGaA, 64271 Darmstadt, Germany). Elemental analyses were conducted by Atlantic Microlab, Inc. (Norcross, Ga.). HPLC analyses were completed with a Beckman analytical gradient system (System Gold). UV spectra were obtained with a Shimadzu UV 201 spectrometer (cell volume 3 mL; cell pass length 10 mm).

Example 1

Preparation of Chiral Stationary Phase
Fmoc-Pro-(Me)Ahx-APS

To 0.80 g of (Me)Ahx-APS silica prepared previously (the surface (Me)Ahx concentration is 0.64 mmol/g) are added mixtures of Fmoc-Pro-OH (3 equiv., 0.52 g), HATU (3 equiv., 0.58 g), and DIPEA (3 equiv., 0.20 g) in 8 mL of DMF. After agitating for 6 h, the resulting silica is filtered and washed with DMF, Methanol, and DCM to yield the desired chiral stationary phase. The surface Pro concentration is determined to be 0.57 mmol/g based on the Fmoc cleavage method. The resulting chiral stationary phase is packed into a 50×4.6 mm HPLC column using a standard slurry packing method.

Example 2

Preparation of Chiral Stationary Phase
Fmoc-$Pro_2$-(Me)Ahx-APS

To 0.80 g of (Me)Ahx-APS silica prepared previously (the surface (Me)Ahx concentration is 0.64 mmol/g) are added mixtures of Fmoc-Pro-OH (3 equiv., 0.52 g), HATU (3 equiv., 0.58 g), and DIPEA (3 equiv., 0.20 g) in 8 mL of DMF. After agitating for 6 h, the resulting silica is filtered and washed with DMF, Methanol, and DCM to yield the desired chiral stationary phase. The surface Pro concentration is determined to be 0.57 mmol/g based on the Fmoc cleavage method. The resulting chiral stationary phase was packed into a 50×4.6 mm HPLC column using the standard slurry packing method.

Example 3

Preparation of Chiral Stationary Phase
Fmoc-$Pro_4$-(Me)Ahx-APS

To 0.80 g of (Me)Ahx-APS silica prepared previously (the surface (Me)Ahx concentration is 0.64 mmol/g) were added mixtures of Fmoc-Pro-OH (3 equiv., 0.52 g), HATU (3 equiv., 0.58 g), and DIPEA (3 equiv., 0.20 g) in 8 mL of DMF. After agitating for 6 h, the resulting silica is filtered and washed with DMF, Methanol, and DCM to yield the desired chiral stationary phase. The surface Pro concentration was determined to be 0.57 mmol/g based on the Fmoc cleavage method. The resulting chiral stationary phase was packed into a 50×4.6 mm HPLC column using the standard slurry packing method.

The following examples set forth various chromatographic measurements. Therein, retention factor (k) equals to $(t_r-t_0)/t_0$ in which $t_r$ is the retention time and $t_0$ is the dead time. Dead time $t_0$ was measured with 1,3,5-tri-t-butylbenzene as the void volume marker. Flow rate at 1 mL/min., UV detection at 254 nm.

Example 4

This example compares chromatographic resolution of racemic compounds with chiral columns, including embodiments of the present invention (Pro2, Pro4, Pro6). $k_1$ is the retention factor of the least retained enantiomer. This example also shows that a mono-proline chiral column does not perform sufficiently.

Furthermore, this example shows embodiments of the present invention in comparison with known columns.

| Analyte name | Analyte Structure | Pro1 | Pro2 | Pro4 | Pro6 | Daicel OD | Daicel AD | Whelk-O2 |
|---|---|---|---|---|---|---|---|---|
| Benzoin | | $\alpha$: 1<br>$k_1$: 5.78<br>3% IPA | $\alpha$: 1.07<br>$k_1$: 8.22<br>3% IPA | $\alpha$: 1.09<br>$k_1$: 6.35<br>3% IPA | $\alpha$: 1.12<br>$k_1$: 16.0<br>5% IPA | $\alpha$: 1.61<br>$k_1$: 4.68<br>3% IPA | $\alpha$: 1.32<br>$k_1$: 3.46<br>15% IPA | $\alpha$: 2.12<br>$k_1$: 1.83<br>5% IPA |
| Hydrobenzoin | | $\alpha$: 1<br>$k_1$: 17.71<br>4% IPA | $\alpha$: 1.12<br>$k_1$: 21.15<br>4% IPA | $\alpha$: 1.13<br>$k_1$: 17.98<br>4% IPA | $\alpha$: 1.15<br>$k_1$: 25.79<br>8% IPA | $\alpha$: 1<br>$k_1$: 7.35<br>4% IPA | $\alpha$: 1.08<br>$k_1$: 5.15<br>8% IPA | $\alpha$: 1.33<br>$k_1$: 4.18<br>4% IPA |
| Benzoin oxime | | $\alpha$: 1<br>$k_1$: 12.28<br>20% IPA | $\alpha$: 1.09<br>$k_1$: 16.08<br>20% IPA | $\alpha$: 1.13<br>$k_1$: 15.36<br>20% IPA | $\alpha$: 1.20<br>$k_1$: 41.45<br>30% IPA | $\alpha$: 1.13<br>$k_1$: 2.82<br>10% IPA | $\alpha$: 1.24<br>$k_1$: 4.55<br>15% IPA | $\alpha$: 1.31<br>$k_1$: 1.40<br>10% IPA |
| 2,2,2-Trifluoro-1-(9-anthryl)ethanol | | $\alpha$: 1<br>$k_1$: 16.40<br>10% IPA | $\alpha$: 1.28<br>$k_1$: 23.44<br>10% IPA | $\alpha$: 1.56<br>$k_1$: 18.48<br>10% IPA | $\alpha$: 1.78<br>$k_1$: 22.58<br>25% IPA | $\alpha$: 1.13<br>$k_1$: 1.26<br>15% IPA | $\alpha$: 1.47<br>$k_1$: 1.99<br>10% IPA | $\alpha$: 1.13<br>$k_1$: 0.62<br>10% IPA |
| $\alpha$-(pentafluoroethyl)-$\alpha$-(trifluoromethyl)-Benzenemethanol | | $\alpha$: 1<br>$k_1$: 19.31<br>3% IPA | $\alpha$: 1.06<br>$k_1$: 16.08<br>3% IPA | $\alpha$: 1.10<br>$k_1$: 8.91<br>3% IPA | $\alpha$: 1.10<br>$k_1$: 8.62<br>5% IPA | $\alpha$: 1.16<br>$k_1$: 0.90<br>1% IPA | $\alpha$: 1.11<br>$k_1$: 0.79<br>3% IPA | $\alpha$: 1<br>$k_1$: 0.70<br>3% IPA |
| Warfarin | | $\alpha$: 1<br>$k_1$: 13.91<br>10% IPA<br>&<br>1% AcOH | $\alpha$: 1.11<br>$k_1$: 10.57<br>10% IPA<br>&<br>1% AcOH | $\alpha$: 1.08<br>$k_1$: 11.19<br>10% IPA<br>&<br>1% AcOH | $\alpha$: 1.18<br>$k_1$: 17.50<br>10% IPA<br>&<br>1% AcOH | $\alpha$: 2.49<br>$k_1$: 6.40<br>15% IPA | $\alpha$: 3.94<br>$k_1$: 5.02<br>20% IPA | $\alpha$: 1.97<br>$k_1$: 10.06<br>20% IPA |
| $\alpha$-Methyl-2-Naphthalenemethanol | | $\alpha$: 1<br>$k_1$: 13.36<br>1% IPA | $\alpha$: 1<br>$k_1$: 22.36<br>1% IPA | $\alpha$: 1.04<br>$k_1$: 17.62<br>1% IPA | $\alpha$: 1<br>$k_1$: 18.81<br>3% IPA | $\alpha$: 1<br>$k_1$: 6.25<br>3% IPA | $\alpha$: 1.05<br>$k_1$: 1.98<br>10% IPA | $\alpha$: 1.02<br>$k_1$: 4.39<br>3% IPA |

-continued

| Analyte name | Analyte Structure | Pro1 | Pro2 | Pro4 | Pro6 | Daicel OD | Daicel AD | Whelk-O2 |
|---|---|---|---|---|---|---|---|---|
| 1-Acenaphthenol | | α: 1<br>$k_1$: 7.83<br>3% IPA | α: 1<br>$k_1$: 13.36<br>3% IPA | α: 1<br>$k_1$: 10.28<br>3% IPA | α: 1<br>$k_1$: 28.06<br>3% IPA | α: 1.16<br>$k_1$: 5.46<br>3% IPA | α: 1.08<br>$k_1$: 6.58<br>3% IPA | α: 1.28<br>$k_1$: 4.96<br>3% IPA |
| 3-Phenyl-Glycidol | | α: 1<br>$k_1$: 5.23<br>3% IPA | α: 1<br>$k_1$: 5.64<br>3% IPA | α: 1<br>$k_1$: 6.77<br>3% IPA | α: 1<br>$k_1$: 10.38<br>5% IPA | α: 1.15<br>$k_1$: 16.87<br>10% IPA | α: 1<br>$k_1$: 8.01<br>8% IPA | α: 1.37<br>$k_1$: 8.74<br>10% IPA |
| 1,1'-Bi-2-naphthol | | α: 1.04<br>$k_1$: 11.48<br>75% IPA | α: 1.16<br>$k_1$: 32.80<br>75% IPA | α: 1.29<br>$k_1$: 28.83<br>75% IPA | α: 1.42<br>$k_1$: 9.94<br>90% IPA | α: 1.16<br>$k_1$: 4.49<br>8% IPA | α: 1.13<br>$k_1$: 3.58<br>25% IPA | α: 1<br>$k_1$: 1.26<br>5% IPA |
| 2,2'-Dihydroxy-5,5',6,6',7,7',8,8'-Octahydro-1,1'-binaphthyl | | α: 1.14<br>$k_1$: 12.58<br>10% IPA | α: 1.17<br>$k_1$: 11.10<br>10% IPA | α: 1.32<br>$k_1$: 10.95<br>10% IPA | α: 1.67<br>$k_1$: 19.75<br>25% IPA | α: 1.32<br>$k_1$: 3.98<br>5% IPA | α: 1<br>$k_1$: 8.53<br>10% IPA | α: 1<br>$k_1$: 4.47<br>5% IPA |
| 1,2,3,4-Tetrahydro-4-(4-methoxyphenyl)-6-methyl-2-thioxo-5-pyrimidinecarboxylic acid ethyl ester | | α: 1.05<br>$k_1$: 14.81<br>15% IPA | α: 1.18<br>$k_1$: 18.68<br>15% IPA | α: 1.24<br>$k_1$: 12.60<br>15% IPA | α: 1.20<br>$k_1$: 23.53<br>15% IPA | α: 1.15<br>$k_1$: 2.13<br>15% IPA | α: 1.40<br>$k_1$: 3.44<br>15% IPA | α: 1.16<br>$k_1$: 2.27<br>15% IPA |
| 1,2,3,4-Tetrahydro-4-(4-hydroxyphenyl)-6-methyl-2-thioxo-5-Pyrimidinecarboxylic acid ethyl ester | | α: 1.12<br>$k_1$: 44.66<br>30% IPA | α: 1.20<br>$k_1$: 27.80<br>50% IPA | α: 1.41<br>$k_1$: 25.07<br>30% IPA | α: 1.32<br>$k_1$: 30.13<br>70% IPA | α: 1.30<br>$k_1$: 2.87<br>15% IPA | α: 1.36<br>$k_1$: 4.62<br>15% IPA | α: 1<br>$k_1$: 2.23<br>15% IPA |

-continued

| Analyte name | Analyte Structure | Pro1 | Pro2 | Pro4 | Pro6 | Daicel OD | Daicel AD | Whelk-O2 |
|---|---|---|---|---|---|---|---|---|
| 1-[1,2,3,4-Tetrahydro-4-(4-methoxyphenyl)-6-methyl-2-thioxo-5-pyrimidine]ethanone | 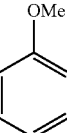 | α: 1<br>$k_1$: 27.03<br>15% IPA | α: 1.20<br>$k_1$: 40.60<br>15% IPA | α: 1.21<br>$k_1$: 25.72<br>15% IPA | α: 1.34<br>$k_1$: 33.90<br>25% IPA | α: 1.18<br>$k_1$: 2.62<br>15% IPA | α: 1.70<br>$k_1$: 3.62<br>15% IPA | α: 1<br>$k_1$: 1.83<br>15% IPA |
| Hexobarbital | 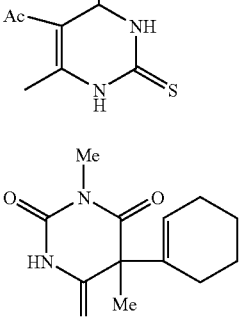 | α: 1<br>$k_1$: 28.86<br>1% IPA | α: 1<br>$k_1$: 22.28<br>1% IPA | α: 1<br>$k_1$: 16.98<br>1% IPA | α: 1<br>$k_1$: 11.26<br>3% IPA | α: 1.12<br>$k_1$: 6.26<br>5% IPA | α: 1.46<br>$k_1$: 2.42<br>8% IPA | α: 1<br>$k_1$: 1.95<br>5% IPA |
| Temazepam | 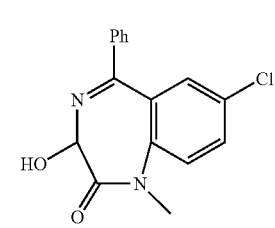 | α: 1.09<br>$k_1$: 22.03<br>2% IPA | α: 1<br>$k_1$: 25.54<br>2% IPA | α: 1<br>$k_1$: 20.24<br>2% IPA | α: 1<br>$k_1$: 25.52<br>5% IPA | α: 1<br>$k_1$: 3.39<br>25% IPA | α: 1<br>$k_1$: 4.12<br>25% IPA | α: 1.19<br>$k_1$: 3.40<br>25% IPA |
| 5-Methyl-5-(2,5-dichloro phenyl)hydantoin | 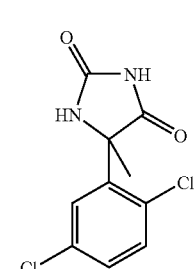 | α: 1<br>$k_1$: 11.21<br>15% IPA | α: 1.16<br>$k_1$: 14.6<br>15% IPA | α: 1.17<br>$k_1$: 8.55<br>15% IPA | α: 1.34<br>$k_1$: 11.64<br>25% IPA | α: 1.08<br>$k_1$: 4.29<br>8% IPA | α: 1<br>$k_1$: 4.80<br>8% IPA | α: 1.11<br>$k_1$: 1.96<br>10% IPA |
| 5-Methyl-5-phenyl hydantoin | 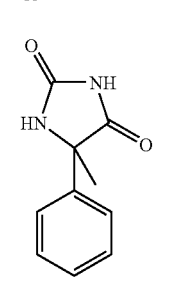 | α: 1<br>$k_1$: 16.24<br>8% IPA | α: 1.10<br>$k_1$: 25.00<br>8% IPA | α: 1.15<br>$k_1$: 15.6<br>8% IPA | α: 1.32<br>$k_1$: 10.7<br>20% IPA | α: 1.09<br>$k_1$: 4.06<br>8% IPA | α: 1<br>$k_1$: 3.24<br>8% IPA | α: 1.46<br>$k_1$: 1.67<br>10% IPA |
| Mephenytoin | 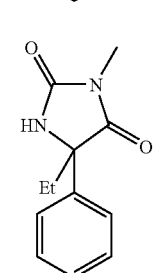 | α: 1<br>$k_1$: 5.86<br>2% IPA | α: 1.14<br>$k_1$: 7.86<br>2% IPA | α: 1.14<br>$k_1$: 6.93<br>2% IPA | α: 1.27<br>$k_1$: 9.85<br>3% IPA | α: 1.10<br>$k_1$: 5.20<br>4% IPA | α: 1.37<br>$k_1$: 3.56<br>4% IPA | α: 1<br>$k_1$: 3.35<br>4% IPA |

-continued

| Analyte name | Analyte Structure | Pro1 | Pro2 | Pro4 | Pro6 | Daicel OD | Daicel AD | Whelk-O2 |
|---|---|---|---|---|---|---|---|---|
| sec-Butyl-carbanilate | | α: 1<br>$k_1$: 3.62<br>1% IPA | α: 1<br>$k_1$: 7.30<br>1% IPA | α: 1<br>$k_1$: 7.64<br>1% IPA | α: 1<br>$k_1$: 15.34<br>3% IPA | α: 1<br>$k_1$: 6.18<br>2% IPA | α: 1.04<br>$k_1$: 3.35<br>2% IPA | α: 1.05<br>$k_1$: 3.36<br>1% IPA |
| Methyl Mandelate | | α: 1.02<br>$k_1$: 7.97<br>1% IPA | α: 1.10<br>$k_1$: 10.8<br>1% IPA | α: 1.17<br>$k_1$: 8.31<br>1% IPA | α: 1<br>$k_1$: 17.49<br>3% IPA | α: 1.25<br>$k_1$: 2.82<br>3% IPA | α: 1.08<br>$k_1$: 1.85<br>10% IPA | α: 1.07<br>$k_1$: 1.12<br>10% IPA |

Example 5

Specific Embodiments, for Exemplary Purposes, of the Stationary Phase Compounds of the Present Invention and Silica Supports This example sets forth poly-proline compounds of the present invention, including embodiments with different end-capping groups. The end-capping groups are bonded to the nitrogen atom that is further away from the support. As is noted in the example, some end-capping groups such as pivaloyl (PIV) (CSP-1) are more effective for some analytes than others, such as TAPA. Overall, several different end-capping groups useable with the present invention such as Piv, Fmoc, Boc, Cbz, Aca, Dmb, Tpa all work well. CSP-11, which has not end-capping group, did not perform as well with respect to some analytes.

Pro-Pro-N(Me)-Ahx-APS: CSP-11

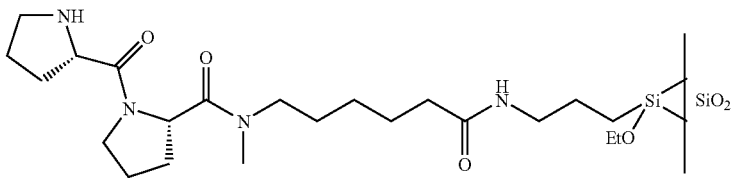

Piv-Pro-Pro-N(Me)-Ahx-APS: CSP-1

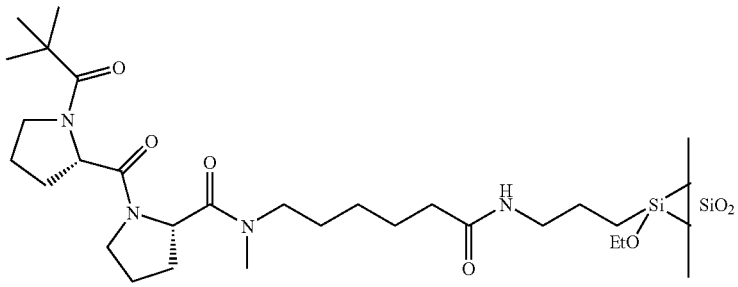

-continued
Fmoc-Pro-Pro-N(Me)-Ahx-APS: CSP-6
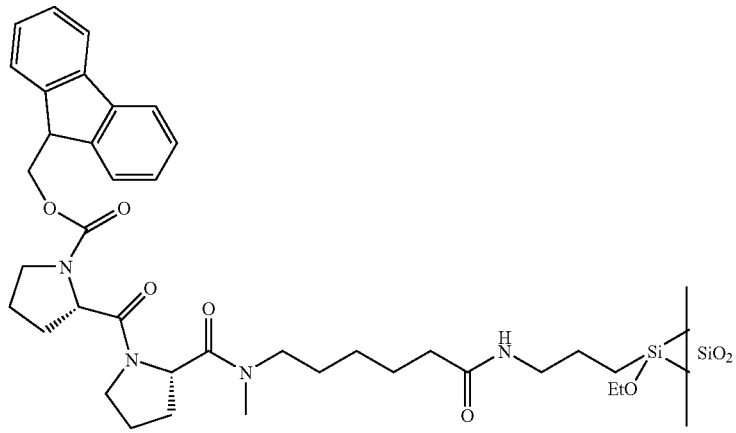
Boc-Pro-Pro-N(Me)-Ahx-APS: CSP-12
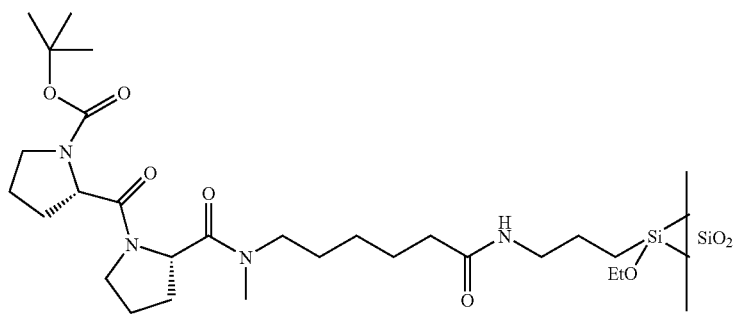
Cbz-Pro-Pro-N(Me)-Ahx-APS: CSP-13
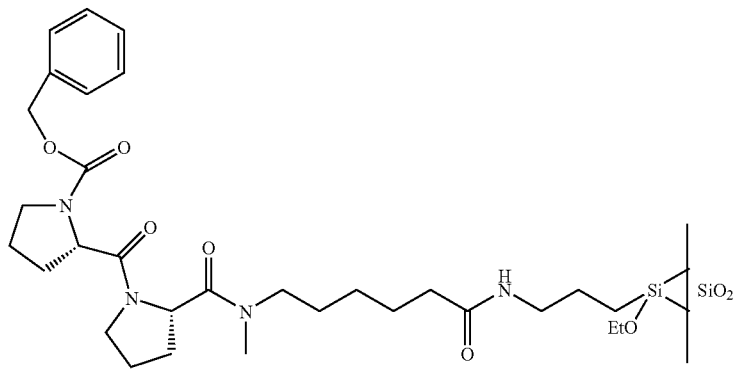
Aca-Pro-Pro-N(Me)-Ahx-APS: CSP-14
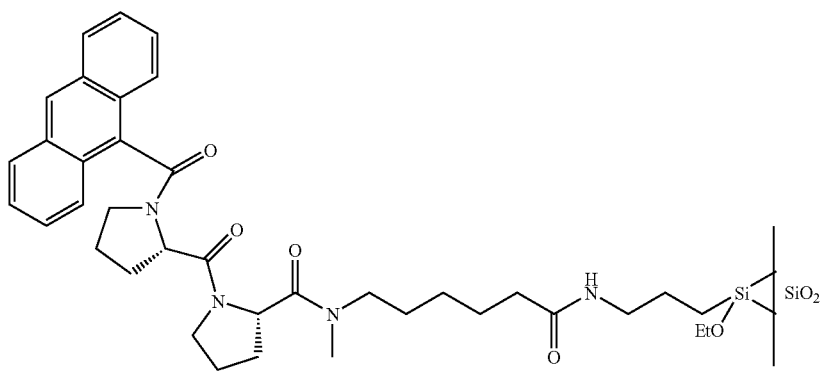

Tapa-Pro-Pro-N(Me)-Ahx-APS: CSP-15
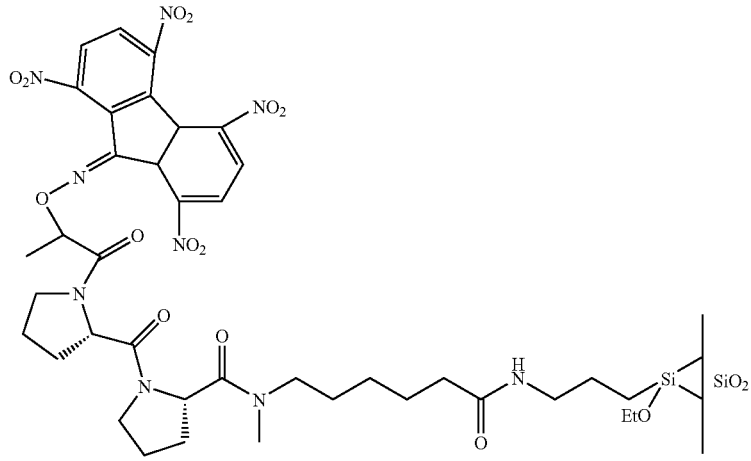
Dmb-Pro-Pro-N(Me)-Ahx-APS: CSP-16
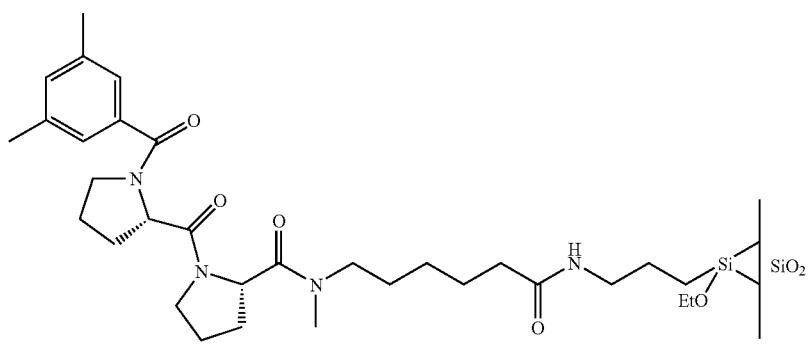
Tpa-Pro-Pro-N(Me)-Ahx-APS: CSP-17
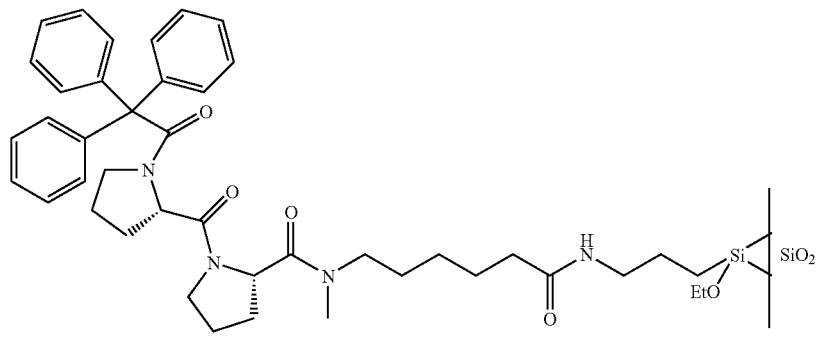

Example 6

This example compares chromatographic resolution of racemic compounds with Fmoc-Pro-Pro-Pro-Pro-N(Me)-Ahx-APS, which is an embodiment of the present invention, in two mobile phase systems. Accordingly, this example helps demonstrate the flexibility of chiral stationary phases of the present invention in different mobile phase systems.

| Analyte name | IPA/Hex | DCM/Hex/MeOH |
|---|---|---|
| Benzoin | α: 1.09<br>$k_1$: 6.35<br>3% IPA | α: 1.07<br>$k_1$: 11.61<br>5% DCM in Hexane |
| Hydrobenzoin | α: 1.13<br>$k_1$: 17.98<br>4% IPA | α: 1.12<br>$k_1$: 12.93<br>40% DCM in Hexane |
| Benzoin oxime | α: 1.13<br>$k_1$: 15.36<br>20% IPA | α: 1.08<br>$k_1$: 15.85<br>100% DCM |
| 2,2,2-Trifluoro-1-(9-anthryl) ethanol | α: 1.56<br>$k_1$: 18.48<br>10% IPA | α: 1.20<br>$k_1$: 9.54<br>100% DCM |
| a-(pentafluoroethyl)-a-(trifluoromethyl)-Benzenemethanol | α: 1.10<br>$k_1$: 8.91<br>3% IPA | α: 1.06<br>$k_1$: 28.23<br>30% DCM in Hexane |
| Warfarin | α: 1.08<br>$k_1$: 11.19<br>10% IPA & 1% AcOH | α: 1<br>$k_1$: 5.84<br>30% DCM in Hexane & 1% AcOH |
| Sec-Phenethyl alcohol | α: 1.02<br>$k_1$: 8.07<br>1% IPA | α: 1.02<br>$k_1$: 13.08<br>10% DCM in Hexane |
| α-Methyl-2-Naphalenemethanol | α: 1.04<br>$k_1$: 17.62<br>1% IPA | α: 1<br>$k_1$: 23.66<br>10% DCM in Hexane |
| 1-Acenaphthenol | α: 1<br>$k_1$: 10.28<br>3% IPA | α: 1<br>$k_1$: 7.31<br>30% DCM in Hexane |
| 3-Phenyl-Glycidol | α: 1<br>$k_1$: 6.77<br>3% IPA | α: 1<br>$k_1$: 7.39<br>30% DCM in Hexane |
| 1,1'-Bi-2-naphthol | α: 1.29<br>$k_1$: 23.83<br>75% IPA | α: 1.06<br>$k_1$: 12.21<br>1% MeOH in Hexane |
| 2,2'-Dihydroxy-5,5',6,6',7,7',8,8'-Octahydro-1,1'-binaphthyl | α: 1.32<br>$k_1$: 10.95<br>10% IPA | α: 1<br>$k_1$: 12.08<br>50% DCM in Hexane |
| 1,2,3,4-Tetrahydro-4-(4-methoxyphenyl)-6-methyl-2-thioxo-5-pyrimidinecarboxylic acid ethyl ester | α: 1.24<br>$k_1$: 12.60<br>15% IPA | α: 1.18<br>$k_1$: 6.26<br>60% DCM in Hexane |
| 1,2,3,4-Tetrahydro-4-(4-hydroxyphenyl)-6-methyl-2-thioxo-,5-Pyrimidinecarboxylic acid ethyl ester | α: 1.41<br>$k_1$: 25.07<br>30% IPA | α: 1.19<br>$k_1$: 12.72<br>3% MeOH in Hexane |
| 1-[1,2,3,4-Tetrahydro-4-(4-methoxyphenyl)-6-methyl-2-thioxo-5-pyrimidinyl]ethanone | α: 1.21<br>$k_1$: 25.72<br>15% IPA | α: 1.22<br>$k_1$: 12.20<br>60% DCM in Hexane |
| Hexobarbital | α: 1<br>$k_1$: 16.98<br>1% IPA | α: 1<br>$k_1$: 8.08<br>30% DCM in Hexane |
| Temazepam | α: 1<br>$k_1$: 20.24<br>2% IPA | α: 1<br>$k_1$: 4.62<br>10% DCM in Hexane |
| 5-Methyl-5-(2,5-dichloro)phenylhydantoin | α: 1.17<br>$k_1$: 8.55<br>15% IPA | α: 1.12<br>$k_1$: 13.56<br>100% DCM |
| 5-Methyl-5-phenyl hydantoin | α: 1.15<br>$k_1$: 15.6<br>8% IPA\ | α: 1.11<br>$k_1$: 18.51<br>100% DCM |
| Mephentoin | α: 1.14<br>$k_1$: 6.93<br>2% IPA | α: 1.17<br>$k_1$: 17.10<br>20% DCM in Hexane |
| sec-Butyl carbanilate | α: 1<br>$k_1$: 7.64<br>1% IPA | α: 1.12<br>$k_1$: 4.16<br>10% DCM in Hexane |
| Methyl Mandelate | α: 1.17<br>$k_1$: 8.31<br>1% IPA | α: 1<br>$k_1$: 8.18<br>10% DCM in Hexane |

The invention being described, it will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the Attachments be considered as exemplary only, and not intended to limit the scope and spirit of the invention.

Unless otherwise indicated, all numbers expressing quantities of ingredients, properties such as molecular weight, reaction conditions, experimental results, and so forth used in the Specification and Attachments are to be understood as being modified by the term "about." Accordingly, unless specifically indicated to the contrary, are approximations that may vary depending upon the desired properties sought to be obtained by the present invention.

REFERENCES

The following references are incorporated by reference in their entirety.

Welch, C. J.; Pollard, S. D.; Mathre, D. J.; Reider, P. J. *Improved method for rapid evaluation of chiral stationary phase libraries,* 2001.

Murer, P.; Lewandowski, K.; Svec, F.; Frechet, J. M. J. *Chemical Communications (Cambridge)* 1998, 2559–2560.

Weingarten, M. D.; Sekanina, K.; Still, W. C. *Journal of the American Chemical Society* 1998, 120, 9112–9113.

Wang, Y.; Bluhm, L. H.; Li, T. *Analytical Chemistry* 2000, 72, 5459–5465.

Bluhm, L. H.; Wang, Y.; Li, T. *Analytical Chemistry* 2000, 72, 5201–5205.

Maclean, D.; Baldwin, J. J.; Ivanov, V. T.; Kato, Y.; Shaw, A.; Schneider, P.; Gordon, E. M. *Pure and Applied Chemistry* 1999, 71, 2349–2365.

Blodgett, J.; Wang, Y.; Li, T.; Polavarapu, P. L.; Drabowicz, J.; Pietrusiewicz, K. M.; Zygo, K. *Analytical Chemistry* 2002, 74, 5212–5216.
Periasamy, M. *Aldrichimica Acta* 2002, 35, 89–101.
Stinson, S. C. *Chemical & Engineering News* 1995, 73, 44–74.
Okamoto, Y.; Kawashima, M.; Hatada, K. *Journal of the American Chemical Society* 1984, 106, 5357–5359.
Yashima, E.; Yamamoto, C.; Okamoto, Y. *Journal of the American Chemical Society* 1996, 118, 4036–4048.
Berthod, A.; Chen, X.; Kullman, J. P.; Armstrong, D. W.; Gasparrini, F.; D'Acquarica, I.; Villani, C.; Carotti, A. *Analytical Chemistry* 2000, 72, 1767–1780.
Ekborg-Ott, K. H.; Wang, X.; Armstrong, D. W. *Microchemical Journal* 1999, 62, 26–49.
Welch, C. J. *Journal of Chromatography A* 1994, 666, 3–26.
Billiot, E.; Warner, I. M. *Analytical Chemistry* 2000, 72, 1740–1748. Manuscript submitted
Wang, Y.; Li, T. *Analytical Chemistry* 1999, 71, 4178–4182.
Poole, C. F.; Poole, S. K. *Chromatography today;* Elsevier: New York, 1991.
Creighton, T. E. *Proteins. Structures and Molecular Properties.* 2nd ed; W. H. Freeman and Company: New York, 1993.
Carpino, L.; El-Faham, A.; Minor, C. A.; Albericio, F. *Journal of the Chemical Society, Chemical Communications* 1994, 201–203.

I claim:

1. A chiral stationary phase of the following formula:

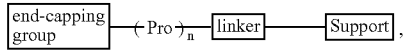

wherein n is any integer of 2 or greater, and analogs and isomers thereof.

2. The chiral stationary phase compound of claim 1, wherein n is any integer from 2 to 10.

3. The chiral stationary phase compound of claim 1, wherein the support is a silica support.

4. The chiral stationary phase compound of claim 1, wherein the linker is an N-alkylamino group.

5. The chiral stationary phase compound of claim 4, wherein the linker is an N-methylamino group.

6. The chiral stationary phase compound of claim 4, wherein the linker is a 6-methylaminohexanoic acid group.

7. The chiral stationary phase of a compound of claim 1, wherein the end-capping group is a Piv, Fmoc, Boc, Cbz, Aca, Tapa, Dmb, or a Tpa.

8. The chiral stationary phase of claim 1, wherein the linker is of the following formula:

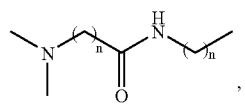

wherein n is an integer from 1–10.

9. The chiral stationary phase compound of claim 1, wherein the linker is of the following formula:

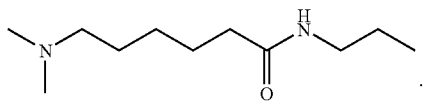

10. The chiral stationary phase compound of claim 1, wherein the end-capping group is a Piv, Fmoc, Cbz, Aca, Tapa, Dub, or Tpa group.

11. The chiral stationary phase compound of claim 1, of the following formula:

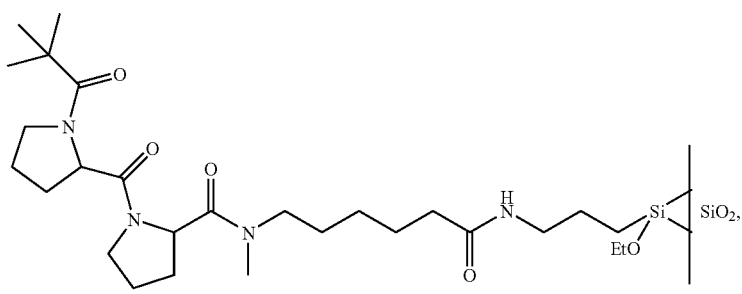

-continued
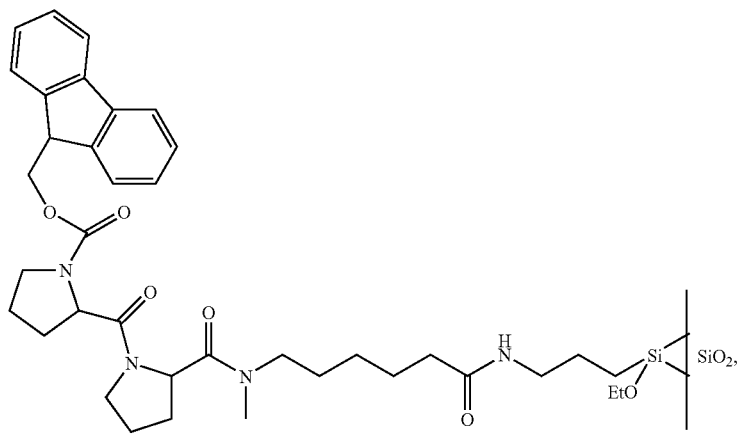
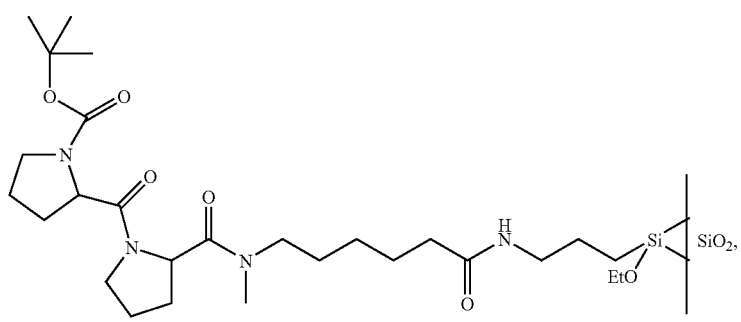
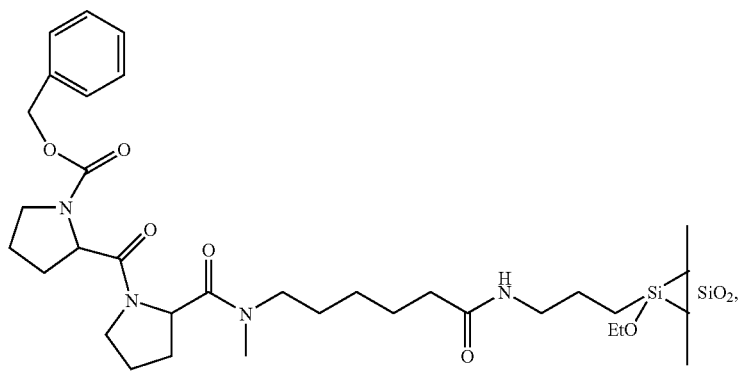
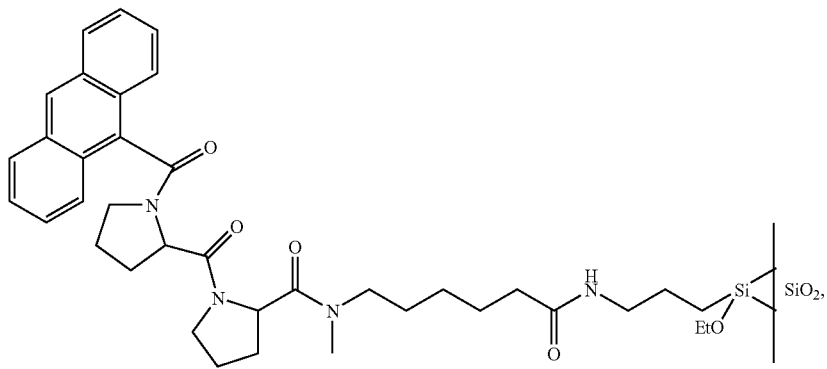

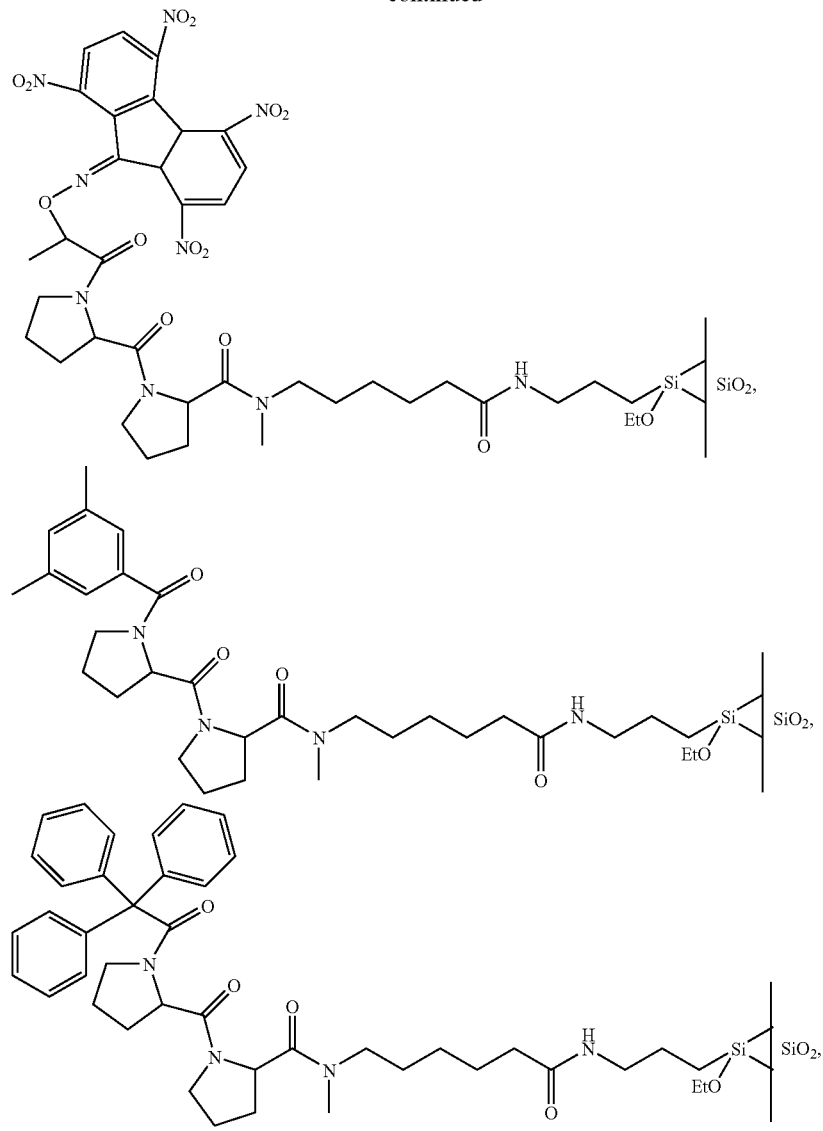
and analogs and isomers thereof.
12. An optically active proline derivative of the formula:
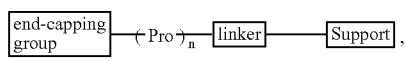
wherein n is any integer of 2 or greater, and analogs and isomers thereof.
13. A chiral column, comprising a chiral stationary phase compound of claim 1.

UNITED STATES PATENT AND TRADEMARK OFFICE
CERTIFICATE OF CORRECTION

| | | |
|---|---|---|
| PATENT NO. | : 7,141,160 B2 | Page 1 of 1 |
| APPLICATION NO. | : 10/833602 | |
| DATED | : November 28, 2006 | |
| INVENTOR(S) | : Tingyu Li | |

It is certified that error appears in the above-identified patent and that said Letters Patent is hereby corrected as shown below:

Title page, item [73], Assignee:

" Vånderbilt University"

should be

--Vanderbilt University-- as appears on Form PTOL-85 filed on May 3, 2006.

Signed and Sealed this

Twenty-sixth Day of June, 2007

JON W. DUDAS
*Director of the United States Patent and Trademark Office*